Dec. 19, 1922.
H. J. LUNGER.
LETTER SHEET.
FILED APR. 7, 1919.
1,439,428.
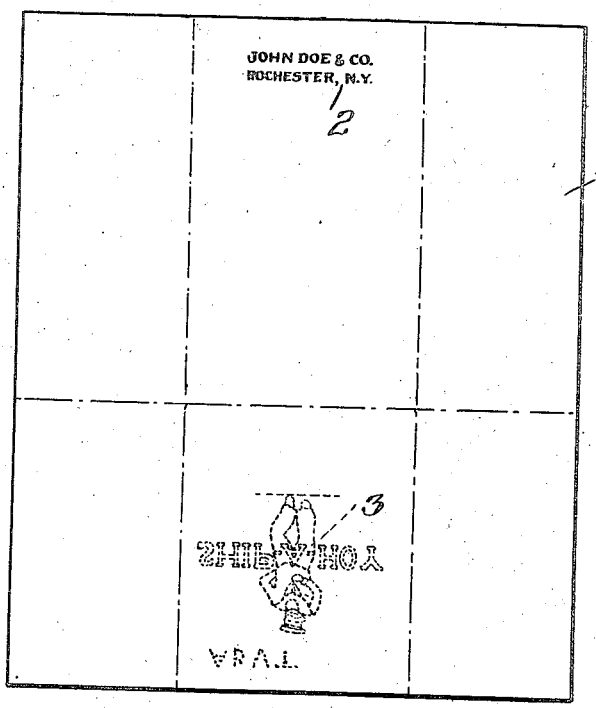
Fig.1
Fig.2
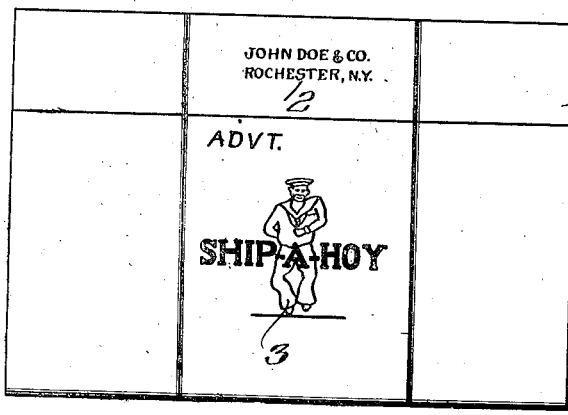
Fig.3
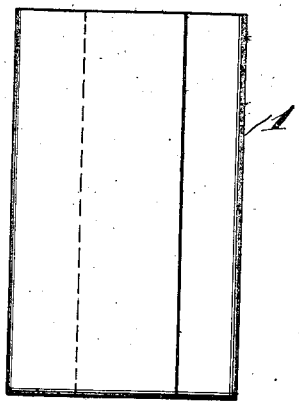
INVENTOR
Henry J. Lunger
BY
his ATTORNEYS Patented Dec. 19, 1922.

1,439,428

UNITED STATES PATENT OFFICE.

HENRY J. LUNGER, OF ROCHESTER, NEW YORK.

LETTER SHEET.

Application filed April 7, 1919. Serial No. 288,168.

*To all whom it may concern:*

Be it known that I, HENRY J. LUNGER, a citizen of the United States, and resident of Rochester, in the county of Monroe and State of New York, have invented certain new and useful Improvements in Letter Sheets, of which the following is a specification.

The present invention relates to letter sheets and it has for an object to so arrange a printed advertisement on the sheet that the advertisment will have attention immediately drawn to it upon the opening of the folded sheet by a recipient.

To this and other ends, the invention consists of certain parts and combinations of parts, all of which will be hereinafter described, the novel features being pointed out in the appended claim.

In the drawings:

Fig. 1 is a plan view of the main face or side of the letter sheet;

Fig. 2 shows the letter sheet folded on a line below the transverse median line of the sheet; and Fig. 3 shows the sheet folded to obscure the advertising matter in a manner for introduction into an ordinary small envelope.

Referring more particularly to the drawings, 1 indicates the front face or the main side of the letter sheet and 2, printed matter arranged at the top of the front face giving the name of the individual, firm, corporation or association by whom the letter sheet is issued. The opposite or reverse side of the sheet has printed a trade mark or other advertising matter 3 situated thereon entirely below the transverse median line through the sheet, this advertising matter being readable in a direction reverse to that of the printed matter at the top of the main side, and the rear face of the sheet above the median line being unprinted. Preferably the advertising matter 3 occupies less than one third of the space between the side edges of the sheet at the middle of the sheet.

With the foregoing arrangement, when the sheet is folded transversely on its transverse median line or to that side of said line nearer the bottom of the main side, and is then folded twice longitudinally of the sheet, the printed matter 3 on the rear face of the sheet will be invisible and will become visible only with the unfolding of the sheet. This arrangement immediately attracts one's attention to the advertising matter 3 upon the opening of the letter sheet along the longitudinal folds, and its sudden and unexpected appearance tends to give exceptional advertising value and especially so since the body of the letter is at this time invisible and can only be seen when the advertising matter 3 is turned out of sight. If the sheet be folded below the transverse median line, the printed matter 2 and 3 on both sides of the sheet will be visible simultaneously.

What I claim as my invention and desire to secure by Letters Patent is:

A letter sheet having on its main side at its top, printed matter giving the name of the individual, firm corporation or association, and on the reverse side advertising matter of the individual, firm, corporation or association whose name appears on the main side of the letter sheet situated entirely below one side of the transverse median line through the sheet and readable in a direction reverse to that of the printed matter on the main side, the rear face of the sheet above the median line being unprinted so that when the sheet is folded transversely at its transverse median line or to that side thereof nearest the bottom of the main side, and is then folded twice longitudinally of the sheet, the printed matter on the rear of the sheet will be invisible and will become visible with the unfolding of the sheet along the longitudinal folds.

HENRY J. LUNGER.